(12) United States Patent
Bullis et al.

(10) Patent No.: US 7,222,313 B2
(45) Date of Patent: May 22, 2007

(54) CREATING DESCRIPTION FILES USED TO CONFIGURE COMPONENTS IN A DISTRIBUTED SYSTEM

(75) Inventors: George Anthony Bullis, Glendora, CA (US); Andrew James Milne, Sierra Madre, CA (US)

(73) Assignee: Finisar Corporation, Sunnyvale, CA (US)

( * ) Notice: Subject to any disclaimer, the term of this patent is extended or adjusted under 35 U.S.C. 154(b) by 408 days.

(21) Appl. No.: 10/959,706

(22) Filed: Oct. 6, 2004

(65) Prior Publication Data
US 2005/0081023 A1 Apr. 14, 2005

Related U.S. Application Data

(60) Provisional application No. 60/509,797, filed on Oct. 9, 2003.

(51) Int. Cl.
*G06F 17/50* (2006.01)

(52) U.S. Cl. .................. 716/3; 716/4; 710/8

(58) Field of Classification Search .............. None
See application file for complete search history.

(56) References Cited

U.S. PATENT DOCUMENTS

| | | | |
|---|---|---|---|
| 5,619,702 A * | 4/1997 | Ilic ......................... 717/151 |
| 6,539,520 B1 * | 3/2003 | Tiong et al. ................ 716/3 |
| 6,654,914 B1 * | 11/2003 | Kaffine et al. .............. 714/43 |
| 6,862,563 B1 * | 3/2005 | Hakewill et al. ........... 703/14 |
| 7,069,526 B2 * | 6/2006 | Schubert et al. ............ 716/4 |
| 7,152,123 B2 * | 12/2006 | Meyer et al. ................ 710/8 |
| 2002/0109726 A1 * | 8/2002 | Rogers et al. ............ 345/771 |
| 2003/0159124 A1 * | 8/2003 | Fisher ...................... 716/18 |
| 2005/0102488 A1 * | 5/2005 | Bullis ....................... 712/14 |
| 2005/0114083 A1 * | 5/2005 | Bullis ..................... 702/183 |

OTHER PUBLICATIONS

Definition of Verilog from Wikipedia.*
IEEE Standard Interface for Hardware Description Models of Electronic Componenents, pp. 1-12, IEEE, 1999.*

* cited by examiner

*Primary Examiner*—Khanh Dang
(74) *Attorney, Agent, or Firm*—Workman Nydegger

(57) ABSTRACT

The present invention provides for creating description files used to configure components in a distributed system. A computer or program developer accesses an application type. The computer or program developer accesses a hardware specification. The computer or program developer identifies relevant registers from the hardware specification that are to be manipulated to implement the application type. The computer or program developer generates a description file that corresponds the relevant registers to the application type.

28 Claims, 7 Drawing Sheets

CREATING DESCRIPTION FILES USED TO CONFIGURE COMPONENTS IN A DISTRIBUTED SYSTEM

CROSS-REFERENCE TO RELATED APPLICATIONS

The present application claims priority to U.S. Provisional Patent Application Ser. No. 60/509,797 entitled "Creation Of Description Files Used To Configure Components In A Distributed System" filed Oct. 9, 2003, which is hereby incorporated by reference.

BACKGROUND OF THE INVENTION

1. The Field of the Invention

The present invention relates generally configuring components in a distributed system. More particularly, embodiments of the present invention relate to creating description files used to configure components in a distributed system.

2. Background and Relevant Art

Nearly all computing devices include a processor and one or more registers. Registers are used to temporarily store data that is to be or has been processed by the processor. For example, when a computing device is to perform an addition operation, each input value is first stored in a register. The processor then retrieves the input values and calculates the sum of the input values. Then sum is then stored as an output value in a register. Execution of appropriate software at a computing device can cause values to be stored in and retrieved from registers.

In many computing environments, direct access to registers is not needed. For example, in a home or office computing environments, most users have no knowledge (and probably do not care) how registers operate. In these computing environments, system software (e.g., an operating system, compiler generated instructions, etc.) automatically controls access to registers. Automated control of registers allows users to operate most, if not all, applications (e.g., word processing, electronic mail, etc) without having knowledge of register operation.

Even programmers that program in high-level languages (e.g., C++, C#, Visual Basic) do not necessarily have to have any knowledge of register operation. For example, a programmer could write source code that multiplies two numbers together without having to include instructions that expressly reference any registers. During compilation of the source code into computer-executable instructions (e.g., machine code), the compiler would include additional computer-executable instructions for appropriately accessing registers.

However, in some environments, more direct control of registers is beneficial. For example, in network testing environments, network testing devices may need to be precisely configured for operation in many different (and sometimes adverse) network conditions. Configuring network testing devices can include modifying various configuration options based on current testing needs. Often, configuration options are represented by values stored in network testing device registers. Thus, a technician or administrator can change the values of network testing device registers to configure a network testing device. Since changes to network testing device registers may occur quite frequently, network testing devices often include software for interfacing directly with network testing device registers.

Development of register manipulation software for interfacing directly with network testing device registers typically includes a system programmer developing a series of functions for accessing appropriate registers. For example, a network testing device may be configured with a clock speed register for changing the network testing device's clock speed. Accordingly, the system programmer can develop a customized set clock function that directly accesses and changes the value stored in the clock speed register. Internal to the set clock function would be a hard-coded value representing the address of the clock speed register.

Register manipulation software can also include a number of other customized functions for changing other network testing device options (e.g., protocol, transmission speed, buffer sizes, etc). Accordingly, internal to each of these other customized functions would also be a hard-coded value representing the address of an appropriate register. Thus, as the number of configuration options increase, so does the number of customized functions included in a network testing device's register manipulation software. A coding error in any one customized function can cause a network test to fail or otherwise operate improperly (e.g., capture incorrect network traffic, store captured data in an incorrect buffer, etc). Since a customized function is typically utilized for each configuration option, network testing devices with increased numbers of configuration options have a corresponding increased chance of operating improperly during a test.

Therefore systems, methods, and computer program products that facilitate more efficient development of register manipulation software would be advantageous.

BRIEF SUMMARY OF THE INVENTION

The foregoing problems with the prior state of the art are overcome by the principles of the present invention, which are directed towards methods, systems, and computer program products for creating description files used to configure components in a distributed system. A computer or program developer accesses an application type. The computer or program developer accesses a hardware specification. The computer or program developer identifies relevant registers from the hardware specification that are to be manipulated to implement the application type. The computer or program developer generates a description file that corresponds the relevant registers to the application type.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
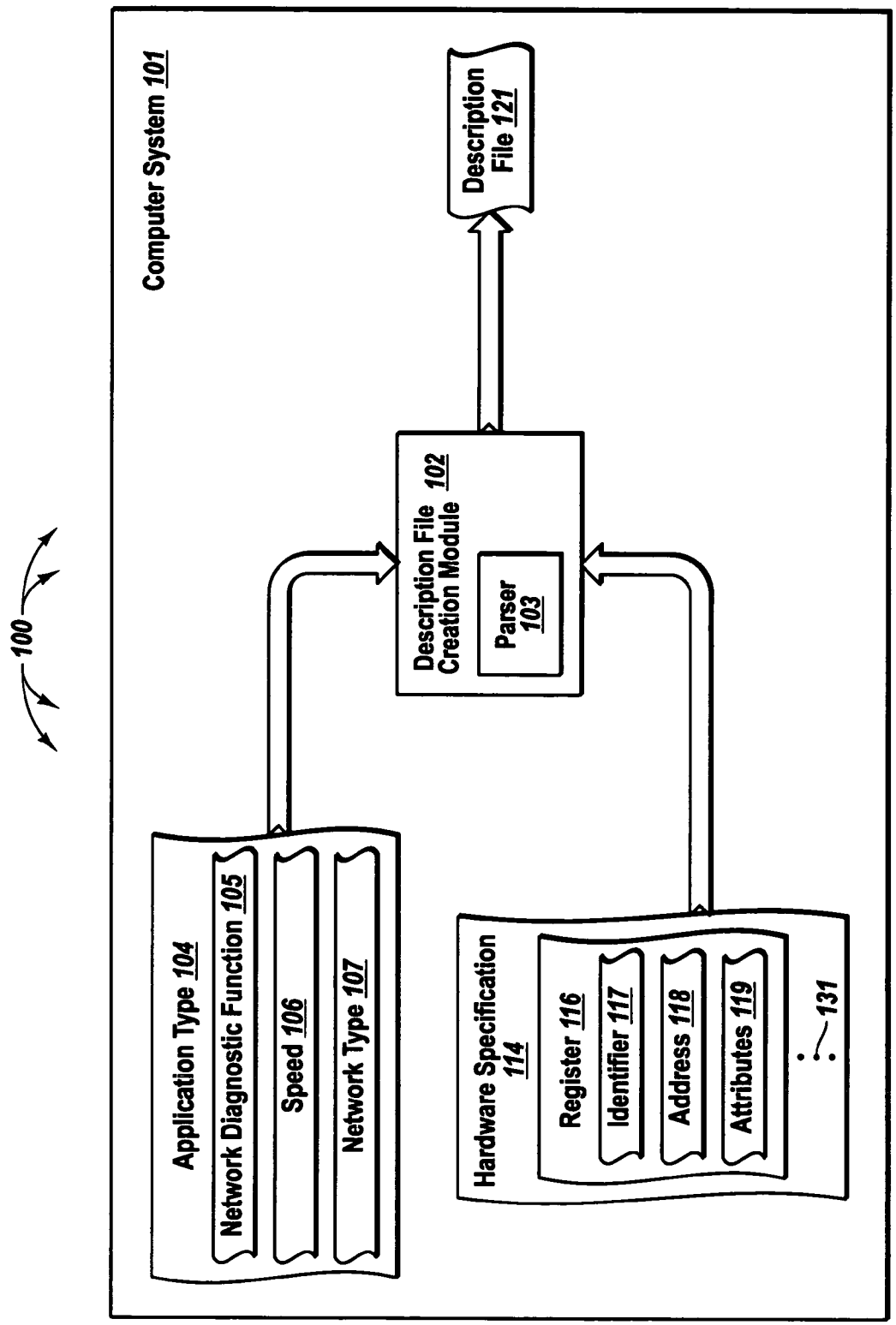
FIG. 1 illustrates an example architecture and associated modules and data structures for creating description files used to configure components in a distributed system in accordance with the principles of the present invention.

The principles of the present invention provide for creating description files used to configure components in a distributed system. A computer or program developer accesses an application type. The computer or program developer accesses a hardware specification. The computer or program developer identifies relevant registers from the hardware specification that are to be manipulated to implement the application type. The computer or program developer generates a description file that corresponds the relevant registers to the application type.

A diagnostic chassis contains one or more configurable network diagnostic modules. Each network diagnostic module includes one or more programmable logic modules (e.g., one or more Field Programmable Gate Arrays ("FPGAs")) that include circuitry for implementing any of a plurality of different network diagnostic functions (e.g., network analyzer, jammer, generator, bit rate error test, etc). Each programmable logic module controls one or more test ports that provide interfaces for different physical configurations (e.g., Gigabit Ethernet, Fiber Distributed Data Interface, Fiber Channel, etc.) and that can interoperate with the programmable logic module to implement a selected network diagnostic function. In some embodiments, a network diagnostic module is included in a printed circuit board (hereinafter referred to as a "card" or "blade") that is inserted into an appropriate receptacle at a chassis (e.g., using a Peripheral Component Interconnect ("PCI") interface). Accordingly, the network diagnostic module may exchange data through electrical contacts of the receptacle.

Generally, a network diagnostic module receives a bit file with instructions for implementing a selected diagnostic function at one or more test ports that interface with a network. A bit file can be received from a mass storage device or even from a memory location at the network diagnostic module. Instructions can include computer-executable or computer-interpretable code that is processed by the network diagnostic module to implement the selected network diagnostic function.

The network diagnostic module identifies a programmable logic module (e.g., an FPGA) that controls the one or more test ports. The network diagnostic module loads the included instructions at the identified programmable logic module to cause the programmable logic module and the one or more test ports to interoperate to implement the selected diagnostic function. Accordingly, instructions contained in a bit file can be loaded into an FPGA to cause the FPGA to implement any of a network analyzer, jammer, bit error rate tester, generator, etc. When a new implementation is desired (e.g., changing from a jammer to a bit error rate tester) instructions from a new bit file can be loaded.

It may be that a network diagnostic function is part of a "port personality" represented in a bit file. For example, a port personality can include a network diagnostic function, a speed (e.g., 1.065, 2.5, or 10.3125 Gigabits per second), and a protocol (e.g., Fiber Channel, Gigabit Ethernet, Infiniband, etc). Thus, a programmable logic module can process computer-executable or computer-interpretable instructions to cause a programmable logic module and a corresponding test port or test ports to interoperate to implement a port personality in accordance with the processed computer-executable or computer-interpretable instructions. For example, a programmable logic module can process instructions from a bit file to cause the programmable logic module and corresponding test ports to interoperate to implement a Fibre Channel jammer at 2.125 Gb/s. Accordingly, the personality of the corresponding test ports can include implementation of a particular network diagnostic function.

In some embodiments, a number of network diagnostic modules are included in a common chassis computer system. Thus, chassis computer systems with increased numbers of flexibly configurable test ports can be utilized to test a network. A common chassis computer system can include a mass storage interface for transferring network diagnostic data to and/or from a mass storage device, a trigger port for detecting the occurrence of events, an interconnect port for connecting to other chasses, and a remote access port for receiving commands from remote computer systems. Connected chasses can exchange control signals over links between corresponding interconnect ports. Accordingly, network diagnostic modules at a number of different chasses can be controlled from any of the other chasses. Connecting a number of chasses together can further increase the number test ports utilized to test a network.

FIG. 1 illustrates an example of computer system architecture 100 and associated modules and data structures for crating description files used to configure components in a distributed system in accordance with the principles of the present invention. FIG. 1 depicts computer system 101. Computer system 101 can be connected to a network, such as, for example, a Local Area Network ("LAN"), Wide Area Network ("WAN") or even the Internet. Computer system 101 can utilize the network to compatibility transfer electronic messages (e.g., to a chassis) in accordance with any number of different protocols, such as, for example, Internet Protocol ("IP") and other protocols (e.g., Transmission Control Protocol ("TCP"), Simple Mail Transfer Protocol ("SMTP"), and HyperText Transfer Protocol ("HTTP")) that utilize IP.

Computer system 101 includes description file creation module 102. Generally, description field creation module 102 can receive an application type (e.g., an indication of a specified network diagnostic function) and a hardware specification (e.g., for a specified type of blade) and can output a description file that corresponds registers of the specified blade type to the application type. Parser 103 can parse application type 104 and/or hardware specification to identify relevant data (e.g., identifying registers that are to be implemented to implement the application type).

Application type 104 represents a port personality that is to be implemented. Application type 104 includes network diagnostic function 105 (e.g., a BERT, jammer, generator, or analyzer), speed 106 (e.g., 2.5 Gb/s, 10.3125 GB/s, etc), and network type 107 (e.g., Infiniband, SONENT, Gigabit Ethernet.). Hardware speciation includes register 116, as well as possible include one or more additional registers as represented by vertical ellipsis 131. Register 116 includes identifier 117 (e.g., a register name), address 118 (e.g., an address offset), and attributes 119 (e.g., a bit mask value, a shift value, a control bit value, etc). Hardware specification 114 (e.g., a hardware specification for blade 501) can be a hardware specification particular type of blade selected from among a plurality of different types of blades.

Description file 121 can be a file that corresponds relevant registers (e.g., register 537) from hardware specification 114 to application type 104. For example, description file 121 can indicate that to implement a 10.51875 GB/s SONET BERT at a blade of the type represented by hardware specification 114, a register at offset 0×0020 must have the least four significant bits set to 1010. Description file 121 can also indicate settings for other registers needed to implement 10.51875 GB/s SONET BERT (e.g., a value for network type and network diagnostic function) at a blade of the type represented by hardware specification 114.

Figure 2:
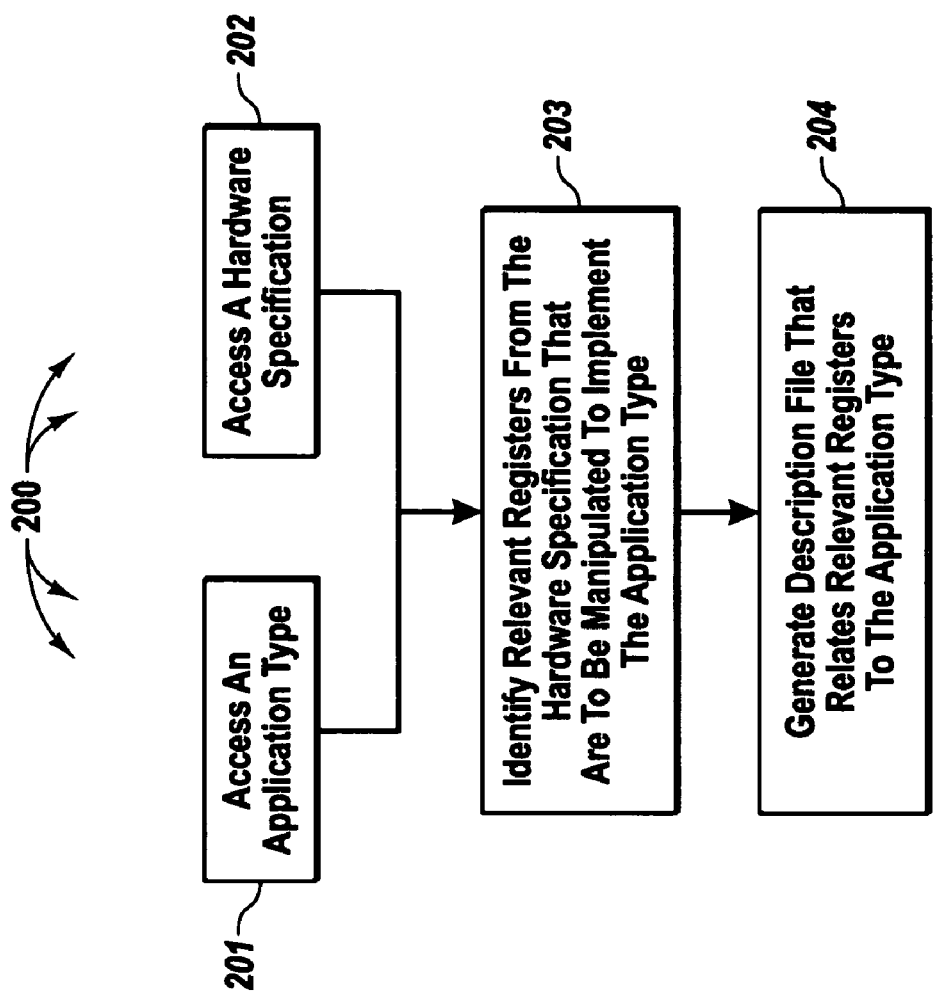
FIG. 2 illustrates a flowchart of a method for creating description files used to configure components in a distributed system in accordance with the principles of the present invention.

FIG. 2 illustrates a flowchart of a method 200 creating description files used to configure components in a distributed system. The method 200 will be discussed with respect to the modules and data structures depicted in network architecture 100. The method 200 includes an act of accessing an application type (act 201). Act 201 can include a computer system accessing an application type. For example, computer system 101 can access application type 104. Alternately, act 201 can include a program developer accessing an application type. For example, a program developer that is developing an application can access application type 104.

The method 200 includes an act of accessing a hardware specification (act 202). Act 202 can include a computer system accessing a hardware specification. For example, computer system 101 can access hardware specification 114. Alternately, act 202 can include a program developer accessing a hardware specification. For example, a program developer that is developing an application can access hardware specification 114.

The method 200 includes an act of identifying relevant registers from the hardware description that are to be manipulated to implement the application type (act 203). Act 203 can include a computer system identifying relevant registers from the hardware description that are to be manipulated to implement the application type. For example, computer system 101 can identifying registers from hardware specification 114 that are to be manipulated to implement application type 104. Identifying relevant registers can include parser 103 parsing hardware specification 114 to identify relevant registers (e.g., register 116) that are to be manipulated to compatible implement network diagnostic function 105 at speed 106 on network type 107.

Alternately, act 203 can include a program developer identifying relevant registers from the hardware description that are to be manipulated to implement the application type. For example, a program developer can identifying registers from hardware specification 114 that are to be manipulated to implement application type 104. The program developer can transliterate the hardware specification to identify registers.

The method 200 includes an act of generating a description file that relates the relevant registers to the application type (act 204). Act 204 can include a computer system generating a description file that relates the relevant registers to the application type. For example, computer system 101 can generate description file 121. Description file 121 can indicate registers and register values that are to be set to implement application type 104. For example, description file 121 can indicate that register 538 is to have a value of 01010 to implement a Gigabit Ethernet Analyzer at test ports 518 and 519.

Alternately, a program developer can generate a description file that relates the relevant registers to the application type. For example, a program developer can generate description file 121.

Figure 6A:
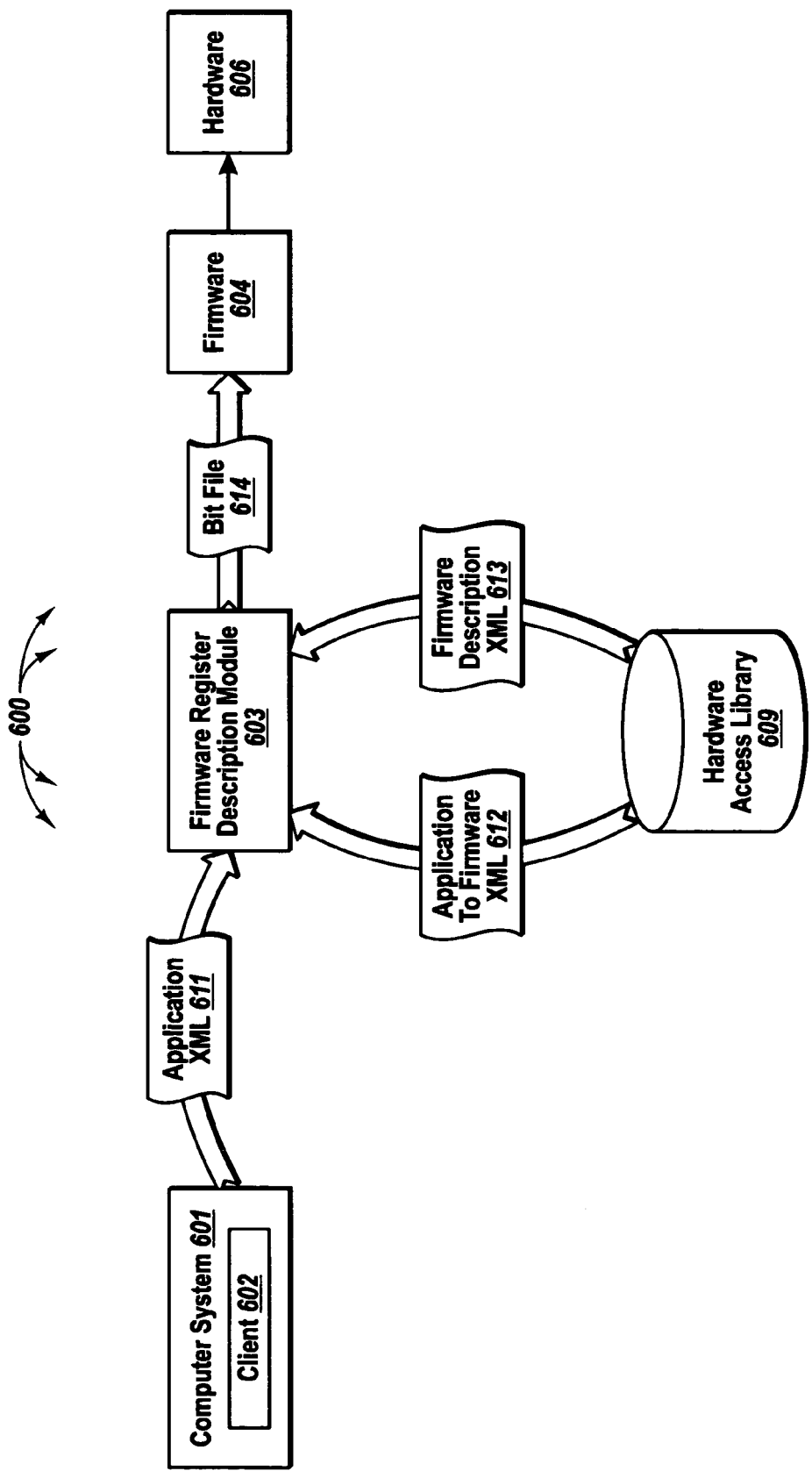
FIG. 6A illustrates an example architecture for configuring a component in a distributed system.

FIG. 6A illustrates an example architecture 600 for configuring a component in a distributed system. As depicted in architecture 600, computer system 601 includes client 602. Client 602 can be an application for generating application eXstensible Markup Language ("XML") instructions, such as, for example, application XML 611. Firmware register description module 603 can receive application XML, such as, for example, application XML 611. Firmware register description module 603 can access application to firmware XML 612 and firmware description XML 613 from hardware access library 607. Application to firmware XML 612 and firmware description XML 613, can be description files (e.g., similar to description file 121) that were previously created by a computer system or program developer and included in hardware access library 609.

Firmware register description module 603 can map tags included in application XML 611 to appropriate values for configuring hardware 606, based on further instructions included in application to firmware XML 612 and firmware description XML 613. Firmware register description module 603 can generate bit file 614 based on the mapped tags and send bit file 614 to firmware 604 (a portion of a distributed component). Firmware 604 can receive and process bit file 614 and configure hardware 606 according to bit file 614.

Firmware register description module 603 (which may be viewed as a server) is configured to reduce the ongoing development and maintenance required to support a plurality of different (and potentially optional) diagnostic subsystems. Subsystems with similar functionality are abstracted, for example, with an identical interface, even if the functionality is implemented differently. Support of new functionality or even new subsystems can be reduced to a minimalist description rather than a new procedural and potentially lengthy and complex implementation.

Firmware register description module 603 enables a developer to support a new distributed component, such as, for example, a blade, or new features on existing blades, with less lines of code and thus less possibility for error. Using firmware register description module 603, new features can be added with as little as a one line description of a firmware register to firmware description XML 612, and as little as one line to application to firmware XML 613. In some embodiments, no changes to executables are required, which reduces the testing burden. New distributed components can be supported by generating component specific firmware description XML and application to firmware XML, which abstract out distributed component differences and present a common interface to client 602. By reducing the amount of code, new features can be added faster and with less opportunity for failure.

Figure 6B:
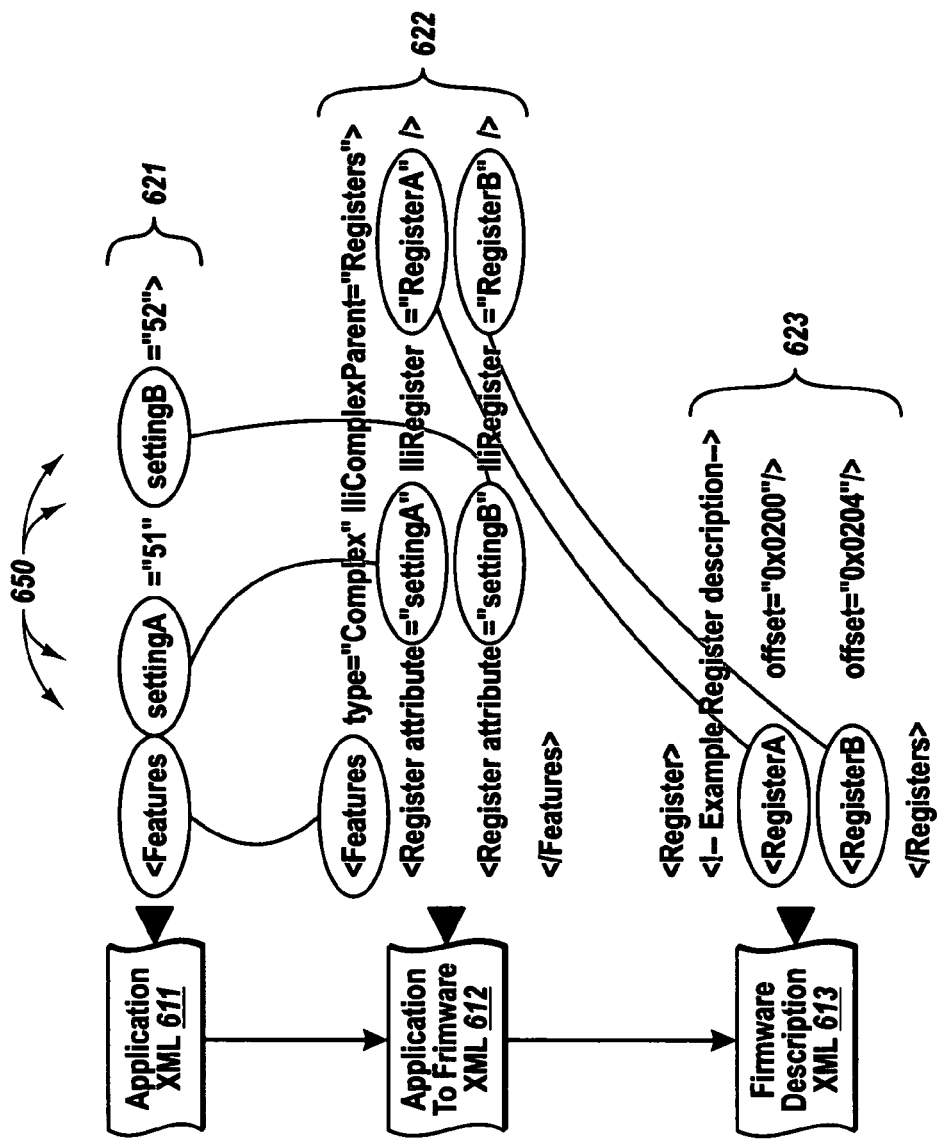
FIG. 6B illustrates an example flow chart for utilizing the components and data in FIG. 6A to configure a component in a distributed system.

FIG. 6B illustrates an example flow chart 650 for utilizing the components and data of architecture 600 to configure a component in a distributed system. Flow chart 650 will be described with respect to the components and data in architecture 600.

As previously described, firmware register description module 600 can receive command, such as, for example, an XML string, from client 602. For example, firmware register description module 603 can receive application XML 611 from client 602. As depicted in flow chart 650, application XML 611 can include computer-executable or computer-interpretable instructions 621 (one or more name/value pairs).

As previously described, firmware register description module 603 can be configured to understand the high level structure application XML 611. Firmware register description module 603 can locate the tags within XML instructions, which used to configure the distributed component firmware from a register mapping. For example, firmware register description module 603 can locate the <Features> tag within instructions 621.

The <Features> tag is looked up in the application to firmware XML 612. If the <Features> tag is not found it can be ignored. However, in the example, flow chart 650, the <Features> tag is found in instructions 622. The <Features> tag in instructions 622 describes how to interpret the <Features> tag in instructions 621. Instructions 622 map "settingA" and "settingB" from instructions 621 to to "RegisterA" and "RegisterB" respectively. Values for "settingA" and "settingB" (i.e., 51 and 52) are rewritten as values for "RegisterA" and "RegisterB" respectively.

"RegisterA" and "RegisterB" are in turn looked up in firmware description XML 613. Instructions 623 map "RegisterA" and "RegisterB" to offsets "0x0200" and "0x0204" respectively. These offset attributes for "RegisterA" and "RegisterB" describe the physical address that the values (i.e., 51 and 52) specified in instructions 612 are to be written to.

The end result can be a calls to distributed component routine, such as, for example:

distributed component->portWrite(addr, value); with addr set to 0x0200 and value set to 51; and distributed component->portWrite(addr, value); with addr set to 0x0204 and value set to 52.

In the example, flow chart 650, the Feature, RegisterA, and RegisterB tokens were application specific and may not be included in firmware register description module 603 source code. Other tokens, such as, for example, memory_start, memory_stop, SpeedReg, ModeReg, MemStartReg, MemStopReg, SpeedReg, ControlReg, ModeReg, DebugReg, XlateReg can also be applicaiotn spefic tokens. Application specific tokes can be soft tokens that are chosen by an author of corresponding XML instrucitons.

The following Examples A, B, and C are examples of description files that can be generated in accordance with the principles of the present invention. Tokens in Example A that are found in an engine (e.g., in firmware register description module 603) include: type, lliComplexParent, Register, attribute, lliRegister, offset. These constitute part of a firmware register description language.

EXAMPLE A

Sample Firmware Description XML

<!—Registers section. This section contains definations for registers (or bit fields in registers) that have a single instance—and that stand alone, i.e. are not part of a group. —><!—

Registers

The child elements of the Registers element (registers) are named after the registers listed in the firmware documentation. Each child element of Registers must have a unique name.

The required attributes of the register elements depend on the kind of register being described.

type="int32"—

The int32 type register is assumed. The only required attribute is offset, which is the address that would be passed to a CPort object to access the register.

type="BIT"—

The BIT type has two required attributes (beyond the type="BIT" attribute). reg="registerelement"is the name of a int32 type register which holds this BIT register. bitvalue="0x0001" is the value to be or'd in to set this bit_register, or nand'd out to clear the bit_register. Note that it is legal to specify more than one bit in the bitvalue.

type="Field"—

The Field type is used to describe multi-bit fields in int32 registers. Like the BIT type, there is a required reg="int32Registerelement" attribute. There are two more attributes which are required; shift="numbitsToShift" and a max="maxvalueofField". Note that the max is used to clear out the field before the new value is or'd in, so the value of the max attribute should be an integer max=$2^{**}n-1$, where n is the width of the bitfield.

type="Match"

The Match type describes Match registers. MatchMask strings are in the form "01XX" where the "XX"'s are don't cares, and all the other digits are to be matched. So when converting these match strings to firmware match values, the X's are set to 0. The Match type registers have an additional optional attribute byteLen="4", which defaults to 4, and is currently always 4 or 32.

type="Mask"

The Mask type describe Mask registers. MatchMask strings are in the form "01XX" where the "XX"'s are don't cares, and all the other digits are to be matched. So when converting these matchMask strings to firmware mask values, the X's are set to 0, and all the other digits are set to F's. The Mask type registers have an additional optional attribute byteLen="4", which defaults to 4, and is currently always 4 or 32.

Optional Register Attributes increment="0x2000"

The presence of the optional increment flag indicates that more than one instance of the register is available in the firmware. Access to successive elements is performed by multiplying the increment by the instance count and adding the result to the reg attribute value. Increment units can be in bytes.

Complexes

Complexes describe a collection of registers that are a related group. Because the subfunctions of the groups of registers are often repeated, the names of registers in a complex are not required to be globally unique. However, they may be unique within the complex in which they are found.

When registers of type BIT and Field, are found in a complex group, the reg attribute can refer to a register which is in the same complex.

Other Types of Register types include:

```
PortDependantBIT, csr_int32, MatchMask SingleByte
-->
<Registers>
<!-- Example Register descriptions -->
    <RegisterA      offset="0x0200"/>
    <RegisterB      offset="0x0204"/>
    <otherregisterC offset="0x0208"/>
    <otherregisterD offset="0x020C"/>
<!-- End of Example Register descriptions -->
    <aControlBit       type="BIT" reg="RegisterA" bitvalue="0x4000"/>
    <anotherControlBit type="BIT" reg="RegisterA"
    bitvalue="0x2000"/
    <controlState      type="Field" reg="RegisterB" shift="0"
    max = "7"/>
</Registers>
```

EXAMPLE B

Sample Application To Firmware XML

```
<!--
App2Firmware.XML contains information to help map AppClient XML
messages to FRD.XML described hardware settings.
-->
<!-- TYPE LIST _____
default type - write value as int32 to register
default bitType - write (value=="True") to bit value
constant - look up value under <Constants> element to write to register BitNegateRegister - write opposite of setting to specified register
BitMatchValue - write truth value of (setting== matchValue) to specified
register
MB2B_AddTCLLIConstant - convert from MB's to Bytes and add to
specificed TC_LLI constant and write to specified register
-->
<!-- ------------ Example Section - Features --------- -->
<Features type="Complex" lliComplexParent="Registers" >
    <Register lliRegister="RegisterA" attribute="speed" />
    <Register lliRegister="RegisterB" attribute="mode" />
    <Register lliRegister="otherregisterC" attribute="settingC" />
    <Register lliRegister="otherregisterD" attribute="settingD" />
</Features>
<!-- End of example -->
</App2Firmware>
```

EXAMPLE C

Sample Application XML

```
<APP_XML version="0.1" date="19/06/03" time="13:38:50"
type="DomainCommand">
```

-continued

```
<Configure>
    <PortConfigure ipAddress="10.32.0.74" bladeNumber="1"
    portNumber="0" >
        <Features speed = "51" mode = "0" />
    </PortConfigure>
</Configure>
</APP_XML>
```

Figure 3:
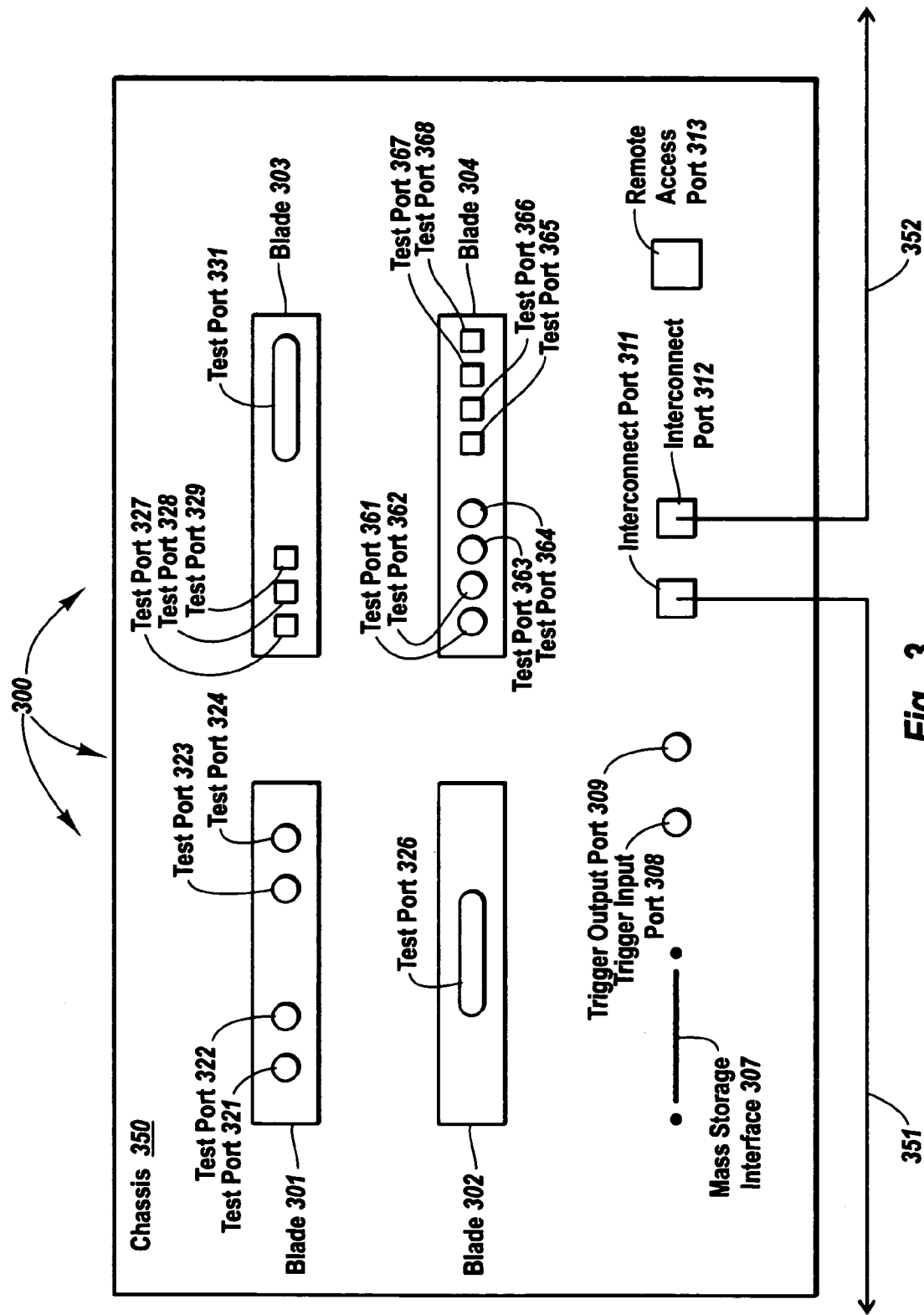
FIG. 3 illustrates an example chassis computer system architecture including a plurality of network diagnostic modules in accordance with the principles of the present invention.

FIG. 3 illustrates an example computer system architecture 300 including a plurality of network diagnostic modules in accordance with the principles of the present invention. Depicted in computer system architecture 300 is chassis 350, which includes blades 301, 302, 303, and 304. Althought not expressed depicted, each of blades 301, 302, 303, and 304 are coupled, through an appropriate bus interface, to a computer system bus of chassis 350. For example, each of blades 301, 302, 303, and 304 can include PCI bus interfaces that are inserted into PCI receptacles at chassis 350. Accordingly, computer-executable or computer-interpretable instructions can be transferred over the computer system bus to blades 301, 302, 303, and 304 to configure and re-configure corresponding test ports. Blades 301, 302, 303, and 304 and chassis 305 can be distributed components that are configured using description files created in accordance with the principles of the present invention.

Blades coupled to a chassis can have different numbers and configurations of test ports. For example, depicted at blade 301 test ports 321, 322, 323 and 324 can each be SFP ports. Depicted at blade 303 test ports 327, 328 and 329 can be RJ-45 ports and test port 331 can be a 300-pin MSA port. Depicted at blade 302 test port 326 can be a 300-pin MSA port. Depicted at blade 304 test ports 361, 362, 363, and 364 can be SFP ports and test ports 365, 366, 367, and 368 can be RJ-45 ports. Accordingly, the test ports of chassis 350 can be simultaneously connected to the same or a variety of different networks, such as, for example, 10 Gigabit Ethernet, 100 Megabit Ethernet, Infiniband, and SONET networks, to implement the same or a variety of different network diagnostic functions.

Mass storage interface 307 can be an interface for coupling to mass storage devices. Accordingly, as network diagnostic data, for example, results of network diagnostic functions, is collected at blades 301, 302, 303, and 304, the network diagnostic data can be transferred to the mass storage device for storage. Statistics and logs resulting from network diagnostic functions can be stored at a coupled mass storage device. Mass storage interface 307 may be a Small Computer System Interface ("SCSI") that is coupled to a SCSI hard drive.

Interconnect ports 311 and 312 (e.g., RJ-11 ports) can be utilized to connect chassis 350 to other chasses (not shown). Connections from chassis 350 to other chasses, for example, as illustrated by links 351 and 352, can be utilized to transfer control signals that coordinate the collection of network diagnostic data. For example, the collection of network diagnostic data for a network analyzer implemented in blade 304 can be coordinated with the collection of network diagnostic data for a bit error rate tester implemented at another chassis coupled to link 351. Accordingly, through the exchange of control signals, it may be that test ports at a plurality of different chasses are configured to implement network diagnostic functions in a coordinated manner.

Trigger input port 308 and trigger output port 309 (e.g., TTL ports) can be utilized to transfer trigger signals to and from chassis 350. Generally, trigger signals can indicate the occurrence of an event to a chassis. In response to the occurrence of an event, a chassis can activate or deactivate network diagnostic functionality. For example, it may be that a programmable logic module controlling test port 326 is implementing a bit error rate tester. However, it may be desirable to activate bit error rate testing of a network coupled to port 326 only when a particular computer system is transmitting data onto the network. An appropriate mechanism for detecting when the particular computer system is transmitting data can be utilized to generate a trigger signal.

When a trigger signal is received at trigger input port 308, bit error rate testing through port test 326 can be activated. When the trigger signal is not longer received at trigger input port 308, bit error rate testing through test port 326 can be deactivated. In some embodiments, for example, when a plurality of chasses are connected, trigger inputs and outputs of different chasses can be coupled together so that the chasses receive the same triggers. For example, trigger input port 308 can be coupled to a trigger output port of a chassis connected to link 351 and/or trigger output port 309 can be coupled to a trigger input port of a chassis connected to link 352. Accordingly, when test ports at a plurality of different chasses are configured to perform coordinated network diagnostic functions, the network diagnostic functions can be activated and deactivated in response to the same events.

Remote access port 313 (e.g., an RJ-45 port) can be utilized to remotely configure chassis 350. Through remote access port 313, chassis 350 can be coupled to a network, such as, for example, a Local Area Network ("LAN") or Wide Area Network ("WAN"), along with one or more other computer systems (e.g., computer system 101). The other computer systems can utilize the network to access configuration information from chassis 350. The other computer systems can also initiate configuration requests to configure or re-configure ports included in chassis 350 and can request results of network diagnostic functions. Accordingly, an administrator or user at a remote computer system can configure the test ports of chassis 350 (as well as configuring test ports at other chasses connected to the network) to implement selected network diagnostic functions and can request collected results.

In some embodiments, a hardware description language defines similar (or the same) low-level instructions for accessing registers of similar types (or of the same type). Using similar definitions for similar registers reduces the coding burden and thus corresponding reduces the chance for error.

Figure 4:
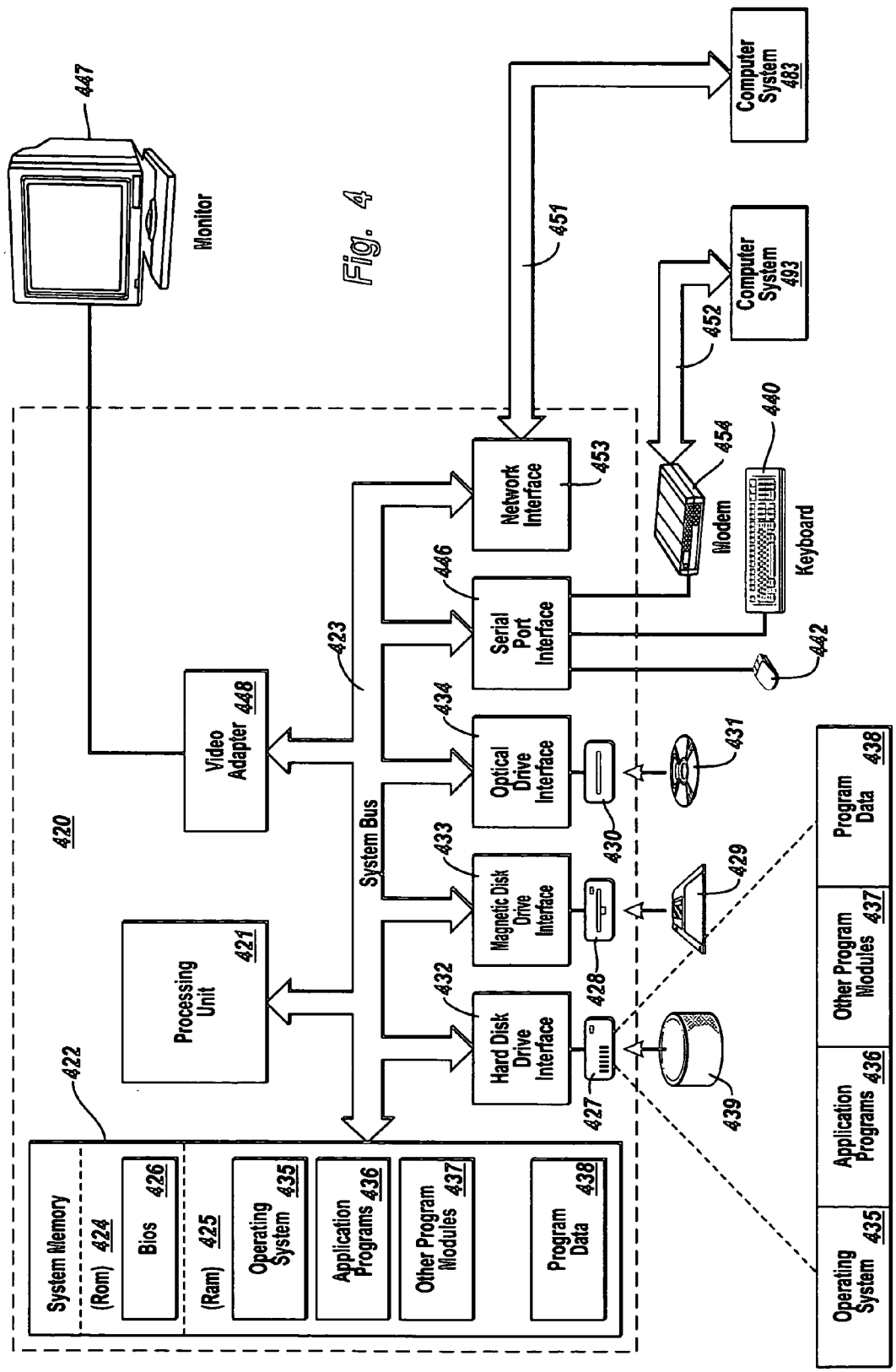
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a PCI bus, a peripheral bus, and a local bus using any of a variety of bus architectures. Computer system 420 can include one or more receptacles for receiving print circuit boards or "cards" that interface with system bus 423. System memory 422 includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 (e.g., a SCSI drive) for reading from and writing to a magnetic hard disk 439, a magnetic disk drive 428 for reading from or writing to a removable magnetic disk 429, and an optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437 (e.g., bit files), and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, computer system chasses containing network diagnostic modules, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 483 via link 451. Link 451 represents a portion of a network, and remote computer system 483 represents a node of the network.

Likewise, computer system 420 includes input/output interface 446, through which computer system 420 receives data from external sources and/or transmits data to external sources. Input/output interface 446 is coupled to modem 454, through which computer system 420 receives data from and/or transmits data to external sources. Alternately, modem 454 can be a Data Over Cable Service Interface Specification ("DOCSIS") modem or digital subscriber lines ("DSL") modem that is connected to computer system 420 through an appropriate interface. However, as depicted in FIG. 4, input/output interface 446 and modem 454 facilitate the exchange of data with remote computer system 493 via link 452. Link 452 represents a portion of a network, and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 483 and/or remote computer system 493. Execution of such modules may be performed in a distributed manner.

Figure 5:
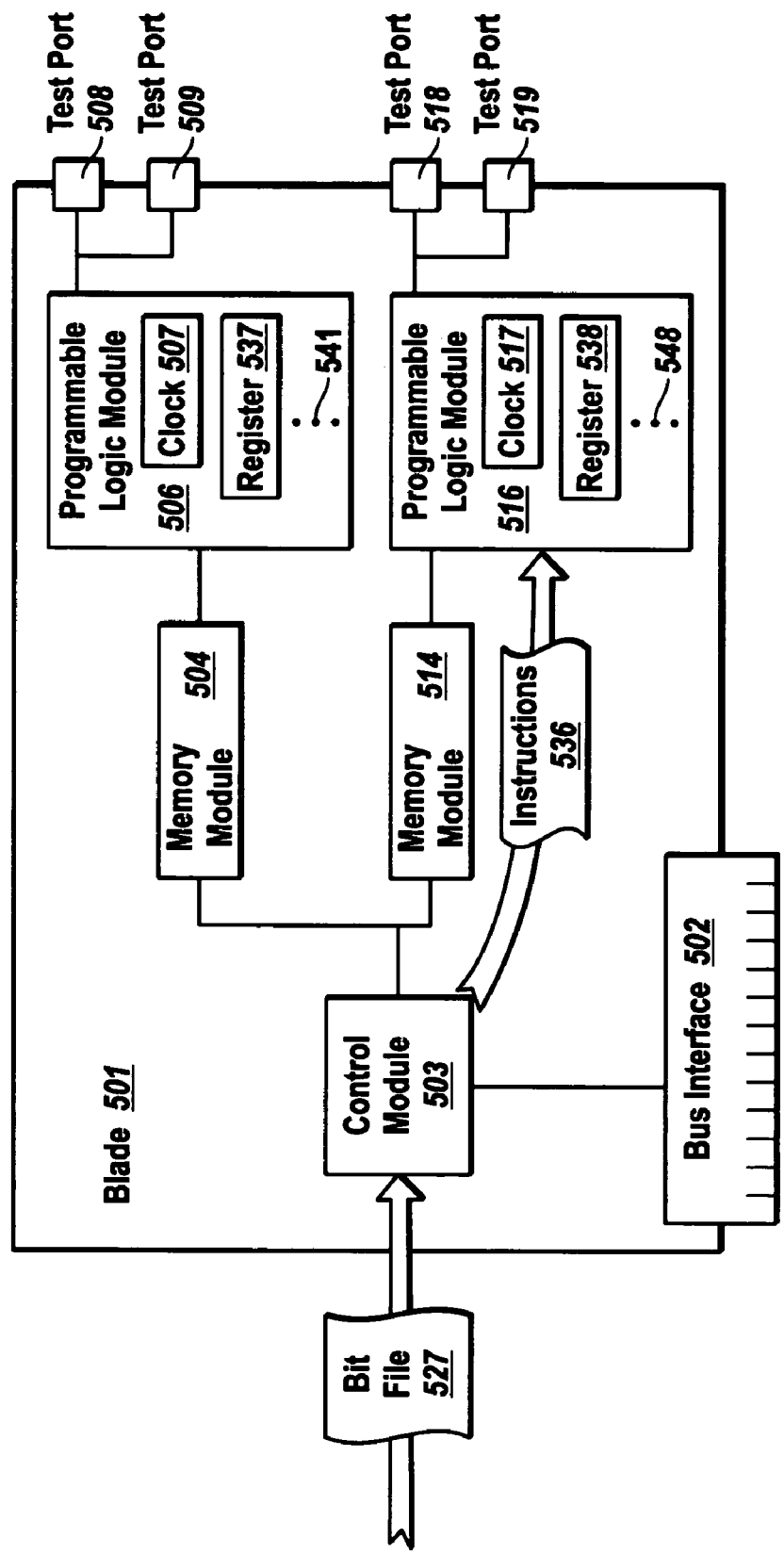
FIG. 5 illustrates an example of a network diagnostic module and diagnostic ports that can interoperate to implement a network diagnostic function in accordance with the principles of the present invention.

FIG. 5 illustrates an example of a network diagnostic module and test ports that can interoperate to implement a network diagnostic function. The network diagnostic module and test ports are implemented in blade 501, which can be a printed circuit board. Bus interface 502 can be inserted into an appropriate receptacle (e.g., a Peripheral Component Interconnect ("PCI") interface) at a computer system to communicatively couple blade 501 to the computer system. Blade 501 can communicate (e.g., sending and receiving appropriate electrical signaling) with a corresponding computer system bus (e.g., a PCI bus) through bus interface 502.

Blade 501 includes memory 504 and programmable logic module 506 that control the functionality of test ports 508 and 509. Memory 504 can be any of a variety of different types of memory, such as, for example, Random Access Memory ("RAM"). Memory 504 can be used to store instructions for programmable logic module 506 and to buffer data that is transferred between programmable logic module 506 and control module 503. Programmable logic module 506 can be virtually any type of programmable circuit, such as, for example, a Field-Programmable Gate Array ("FPGA"), Programmable Logic Array ("PLA"), or other type programmable logic device. Programmable logic module 506 can include circuitry form implementing any of a plurality of network diagnostic functions (e.g., network analyzer, jammer, generator, or bit error rate tester, etc).

It may be that a network diagnostic function is part of a "port personality" represented in a bit file. For example, a port personality can include a network diagnostic function, a speed (e.g., 1.065, 2.5, or 10.3125 Gigabits per second), and a protocol (e.g., Fiber Channel, Gigabit Ethernet, Infiniband, etc). Accordingly, programmable logic module 106 can process computer-executable or computer-interpretable instructions to cause programmable logic module 506 and test port 508 and/or test port 509 to interoperate to implement a port personality in accordance with the processed computer-executable or computer-interpretable instructions. For example, programmable logic module 506 can process instructions from a bit file to cause programmable logic module 506 and test ports 508 and test port 509 to interoperate to implement a Fiber Channel jammer at 2.125 Gb/s. Accordingly, the personality of test port 508 and the personality of test port 509 can include implementation of a particular network diagnostic function.

It may that a plurality of test ports are utilized together to implement a particular network diagnostic function. For example, test ports 508 and 509 can be utilized together to implement a network analyzer. On the other hand, it may be a first test port is utilized to implement a first network diagnostic function, while a second different test port is simultaneously utilized to implement a second different network diagnostic function. For example, test port 508 can be utilized to implement a generator, while test port 509 is simultaneously utilized to implement a bit error rate tester. A bit file having appropriate instructions can be loaded at a programmable logic module 506 to cause test port 508 and test port 509 to simultaneously implement different network diagnostic functions. Clock 507 can coordinate the appropriate timing of data transferred to and from test port 508 and test port 509. The values stored in register 537 and other registers as illustrated by vertical ellipses 547 can be changed to configure or reconfigure (e.g., according to description file 121) the functionality of programmable logic module 506.

Blade 501 also includes memory 514 and programmable logic module 516 that control the functionality of test ports 518 and 519. Similar to memory 504, memory 514 can be any of a variety of different types of memory, such as, for example, Random Access Memory ("RAM"). Memory 514 can be used to store instructions for programmable logic module 516 and to buffer data that is transferred between programmable logic module 516 and control module 503. Similar to programmable logic module 506, programmable logic module 516 can be virtually any type of programmable circuit, such as, for example, a Field-Programmable Gate Array ("FPGA"), Programmable Logic Array ("PLA"), or other type programmable logic device. Similar to programmable logic module 506, programmable logic module 516 can include circuitry form implementing any of a plurality of network diagnostic functions (e.g., network analyzer, jammer, generator, or bit error rate tester, etc). Although not required, it may be that programmable module 506 and programmable logic module 516 are the same type of programmable logic module.

Similar to programmable logic module 506, programmable logic module 516 can process computer-executable or computer-interpretable instructions (e.g., instructions 536) to cause programmable logic module 516 and test port 518 and/or test port 519 to interoperate to implement a port personality (including network diagnostic function, speed, and protocol) in accordance with the processed computer-executable or computer-interpretable instructions. Test ports 518 and 519 can be utilized together to implement a particular network diagnostic function. On the other hand, test port 518 may be utilized to implement a first network diagnostic function, while test port 519 is utilize to implement a second different network diagnostic function.

For example, programmable logic module 516 can process instructions from a bit file (e.g., bit file 527) to cause programmable logic module 516 and test ports 518 to interoperate to implement a Fiber Channel bit error rate test at 10.51875 Gb/s and to cause programmable logic module 516 and test ports 519 to interoperate to implement a Inifiband generator at 1.065 Gb/s. Bit file 527 can include appropriate instructions can be loaded at programmable logic module 516 to cause test port 518 and test port 519 to simultaneously implement different network diagnostic functions.

Clock 517 can coordinate the appropriate timing of data transferred to and from test port 518 and test port 519. The values stored in register 537 and other registers as illustrated by vertical ellipses 548 can be changed to configure or reconfigure (e.g., according to description file 121) the functionality of programmable logic module 516.

Test ports of different programmable logic modules can be configured to implement the same personalities. For example, programmable logic module 506 may process instructions that that cause test ports 508 and 509 to implement a Gigabit Ethernet analyzer at 1.065 GB/s, while programmable logic module 516 also processes instructions that cause test ports 518 and 519 to implement a Gigabit Ethernet analyzer at 1.065 GB/s. On the hand, test ports of different programmable logic modules can be configured to implement different personalities. For example, programmable logic module 506 may process instructions that that cause test ports 508 and 509 to implement a Fiber Channel analyzer at 2.125 GB/s, while programmable logic module 516 processes instructions that cause test ports 518 and 519 to implement an Infiniband analyzer at 10.51875 GB/s.

Test ports 508, 509, 518 and 519 can be of virtually any physical configuration, such as, for example, RJ-11, RJ-45, small form-factor pluggable ("SFP"), Universal Serial Bus ("USB"), IEEE 1394 (Firewire), 300-pin MSA, etc. Test ports 508, 509, 518 and 519 can also be physically configured to receive virtually any type of cabling, such as, for example, cabling that carries electrical signals or carries optical signals. Although not required, it may be that ports controlled by the same programmable logic module are configured as the same type of port. For example, test ports 508 and 509 (both controlled by programmable logic module 506) may both be SFP ports configured to receive optical cable.

Control module 503 coordinates the transfer of data between bus interface 502 and memories 504 and 514. Control module 503 can translate data received from bus interface 502 (e.g., a PCI interface) into a format that can be processed by programmable logic modules included in blade 501. Likewise, control module 503 can translate data received from a programmable logic module into a format that can be compatibly transferred over a computer system bus (e.g., a PCI bus) that is communicatively coupled to bus interface 502. Based on received data (e.g., appropriate addressing information), control module 503 can also identify the programmable logic module that is associated with the received data. Accordingly, control module 503 can transfer at least a portion of the received data (e.g., computer-executable or computer-interpretable instructions) to the associated programmable logic module.

Generally, bit file 527 can include low-level instructions that were converted from application instructions through the use of a description file (e.g., description file 121). Accordingly, bit file 527 can include appropriate instructions for altering register values of blade 501 (e.g., registers 537 and 538). In some embodiments, a series of description files are utilized to convert application instructions into low-level instructions. For example, application instructions (e.g., Example C above) can be converted to mapped application instruction in accordance with a first description file (e.g., Example B above) and the mapped application instructions are subsequently converted to low-level instructions in accordance with a second description file (e.g., Example A above). Accordingly, it may be that a plurality of description files is generated to describe a hardware component (e.g., to describe blade 501).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for creating description files used to configure components in a distributed system, the method comprising the acts of:
   accessing an application type;
   accessing a hardware specification;
   identifying relevant registers from the hardware specification that are to be manipulated to implement the application type; and
   generating a description file that corresponds the relevant registers to the application type.

2. The method as recited in claim 1, wherein the act of accessing an application type comprises an act of accessing an application type representing a port personality.

3. The method as recited in claim 1, wherein the act of accessing an application type comprises an act of a computer system accessing an application type.

4. The method as recited in claim 1, wherein the act of accessing an application type comprises an act of a program developer accessing an application type.

5. The method as recited in claim 1, wherein the act of accessing an hardware specification comprises an act of accessing a hardware specification for a blade that can implement network diagnostic functions.

6. The method as recited in claim 1, wherein the act of accessing an hardware specification comprises an act of a computer system accessing a hardware specification for a blade that can implement network diagnostic functions.

7. The method as recited in claim 1, wherein the act of accessing an hardware specification comprises an act of a program developer accessing a hardware specification for a blade that can implement network diagnostic functions.

8. The method as recited in claim 1, wherein the act of identifying relevant registers from the hardware specification that are to be manipulated to implement the application type comprises an act of a computer system parsing the hardware specification.

9. The method as recited in claim 1, wherein the act of identifying relevant registers from the hardware specification that are to be manipulated to implement the application type comprises an act of a program developer transliterating the hardware specification.

10. The method as recited in claim 1, wherein the act of identifying relevant registers from the hardware specification that are to be manipulated to implement the application type comprises an act of a identifying registers of a blade that are to be manipulated to implement a network diagnostic function.

11. The method as recited in claim 8, wherein the act of identifying registers of a blade that are to be manipulated to implement a network diagnostic function comprises an act of identifying registers of a blade that are to be manipulated to implement a network diagnostic function wherein the network diagnostic function is selected from among a Bit Error Rate Test, a generator, a jammer, and a analyzer.

12. The method as recited in claim 1, wherein the act of generating a description file that corresponds the relevant registers to the application type comprises an act of a computer system generating a description file that corresponds the relevant registers to the application type.

13. The method as recited in claim 1, wherein the act of generating a description file that corresponds the relevant registers to the application type comprises an act of a program developer generating a description file that corresponds the relevant registers to the application type.

14. The method as recited in claim 1, wherein the act of generating a description file that corresponds the relevant registers to the application type comprises an act of generating a description file that identifies registers of a blade that are to be manipulated to implement a port personality represented by the application type.

15. The method as recited in claim 1, wherein the act of generating a description file that corresponds the relevant registers to the application type comprises an act of generating application to firmware XML instructions.

16. The method as recited in claim 1, wherein the act of generating a description file that corresponds the relevant registers to the application type comprises an act of generating firmware description XML instructions.

17. The method as recited in claim 1, further comprising:
an act of sending the description file to a firmware register description module that can use the description file to appropriately interpret application instructions for configuring a distributed component.

18. A computer program product for use at a computer system, the computer program product implementing a method for creating description files used to configure components in a distributed system, the computer program product comprising one or more computer-readable media having stored thereon computer-executable instructions that, when executed, cause the computer system to perform the following:
access an application type;
access a hardware specification;
identify relevant registers from the hardware specification that are to be manipulated to implement the application type; and
generate a description file that corresponds the relevant registers to the application type.

19. The computer program product as recited in claim 18, wherein computer-executable-instructions that when executed cause the computer system to access an application type comprise computer-executable-instructions that when executed cause the computer system to access an application type representing a port personality.

20. The computer program product as recited in claim 18, wherein computer-executable-instructions that when executed cause the computer system to access a hardware specification comprise computer-executable-instructions that when executed cause the computer system to access a hardware specification for a blade that can implement network diagnostic functions.

21. The computer program product as recited in claim 18, wherein computer-executable-instructions that when executed cause the computer system to identify relevant registers from the hardware specification that are to be manipulated to implement the application type comprise computer-executable-instructions that when executed cause the computer system to parse the hardware specification.

22. The computer program product as recited in claim 18, wherein computer-executable-instructions that when executed cause the computer system to identify relevant registers from the hardware specification that are to be manipulated to implement the application type comprise computer-executable-instructions that when executed cause the computer system to identify registers of a blade that are to be manipulated to implement a network diagnostic function.

23. The computer program product as recited in claim 18, wherein computer-executable-instructions that when executed cause the computer system to identify registers of a blade that are to be manipulated to implement a network diagnostic function comprise computer-executable-instructions that when executed cause the computer system to identify registers of a blade that are to be manipulated to implement a network diagnostic function wherein the network diagnostic function is selected from among a Bit Error Rate Test, a generator, a jammer, and a analyzer.

24. The computer program product as recited in claim 18, wherein computer-executable-instructions that when executed cause the computer system to generate a description file that corresponds the relevant registers to the application type comprise computer-executable-instructions that when executed cause the computer system to generate a description file that corresponds the relevant registers to the application type.

25. The computer program product as recited in claim 18, wherein computer-executable-instructions that when executed cause the computer system to generate a description file that corresponds the relevant registers to the application type comprise computer-executable-instructions that when executed cause the computer system to generate a description file that identifies registers of a blade that are to be manipulated to implement a port personality represented by the application type.

26. The computer program product as recited in claim 18, wherein computer-executable-instructions that when executed cause the computer system to generate a description file that corresponds the relevant registers to the application type comprise computer-executable-instructions that when executed cause the computer system to generate application to firmware XML instructions.

27. The computer program product as recited in claim 18, wherein computer-executable-instructions that when executed cause the computer system to generate a description file that corresponds the relevant registers to the application type comprise computer-executable-instructions that when executed cause the computer system to generate firmware description XML instructions.

28. The computer program product as recited in claim 18, further comprising:
computer-executable-instructions that when executed cause the computer system to send the description file to a firmware register description module that can use the description file to appropriately interpret application instructions for configuring a distributed component.

* * * * *

UNITED STATES PATENT AND TRADEMARK OFFICE
CERTIFICATE OF CORRECTION

PATENT NO. : 7,222,313 B2  Page 1 of 1
APPLICATION NO. : 10/959706
DATED : May 22, 2007
INVENTOR(S) : Bullis et al.

It is certified that error appears in the above-identified patent and that said Letters Patent is hereby corrected as shown below:

Column 1
Line 28, change "Then sum" to --The sum--

Column 6
Line 29, change "607" to --609--

Column 12
Line 14, change "or example" to --for example--

Column 14
Line 2, change "106" to --506--
Line 15, change "may that" to --may be that--
Line 31, change "547" to --541--

Column 15
Line 14, change "537" to --538--

Column 17
Line 7, change "a analyzer" to --an analyzer--

Column 18
Line 24, change "a analyzer" to --an analyzer--

Signed and Sealed this

Twenty-third Day of March, 2010

David J. Kappos
*Director of the United States Patent and Trademark Office*